US008531315B2

(12) United States Patent  (10) Patent No.: US 8,531,315 B2
Painter et al.  (45) Date of Patent: Sep. 10, 2013

(54) SYSTEM AND METHOD FOR DISPLAYING RUNWAYS AND TERRAIN IN SYNTHETIC VISION SYSTEMS

(75) Inventors: Brett A. Painter, Columbus, OH (US); Joshua C. Seabloom, Columbus, OH (US)

(73) Assignee: L-3 Communications Avionics Systems, Inc., Grand Rapids, MI (US)

( * ) Notice: Subject to any disclaimer, the term of this patent is extended or adjusted under 35 U.S.C. 154(b) by 275 days.

(21) Appl. No.: 12/910,893

(22) Filed: Oct. 25, 2010

(65) Prior Publication Data

US 2011/0095913 A1  Apr. 28, 2011

Related U.S. Application Data

(60) Provisional application No. 61/254,787, filed on Oct. 26, 2009.

(51) Int. Cl.
*G01C 21/00* (2006.01)
*G01C 23/00* (2006.01)

(52) U.S. Cl.
USPC .............................. 340/972; 340/948; 701/16

(58) Field of Classification Search
USPC .............................. 340/972, 971, 948; 701/16
See application file for complete search history.

(56) References Cited

U.S. PATENT DOCUMENTS

| 4,660,157 | A | 4/1987 | Beckwith, Jr. et al. |
| 4,682,160 | A | 7/1987 | Beckwith, Jr. et al. |
| 5,140,532 | A | 8/1992 | Beckwith, Jr. et al. |
| 5,566,073 | A | 10/1996 | Margolin |
| 5,839,080 | A | 11/1998 | Muller et al. |
| 5,892,462 | A | 4/1999 | Tran |
| 6,092,009 | A | 7/2000 | Glover |
| 6,172,682 | B1 | 1/2001 | Claiborne et al. |
| 6,433,792 | B1 | 8/2002 | Yaron et al. |
| 6,496,189 | B1 | 12/2002 | Yaron et al. |
| 6,621,494 | B2 | 9/2003 | Matsuoka et al. |
| 6,678,588 | B2 | 1/2004 | He |
| 6,700,573 | B2 | 3/2004 | Freeman |
| 6,747,649 | B1 | 6/2004 | Sanz-Pastor et al. |
| 6,862,501 | B2 | 3/2005 | He |
| 6,879,886 | B2 | 4/2005 | Wilkins, Jr. et al. |
| 6,985,091 | B2 | 1/2006 | Price |

(Continued)

OTHER PUBLICATIONS

International Search Report (Form PCT/ISA/210) and Written Opinion of the International Searching Authority (Form PCT/ISA/237) from corresponding Patent Cooperation Treaty Application No. PCT/US10/53947, mailed Dec. 23, 2010.

*Primary Examiner* — John A Tweel, Jr.
(74) *Attorney, Agent, or Firm* — Gardner, Linn, Burkhart & Flory, LLP

(57) ABSTRACT

A method and system for displaying three dimensional images of runways and terrain, as well as additional information, on one or more screens of an avionics display system is provided. The system merges elevation information for terrain points and elevation information for runway points by grouping runways together that are within a threshold distance of each other. For each group, a plane is calculated. The calculated plane is then projected onto all of the runways within the group. The plane may also be projected onto a subset of neighboring terrain points. The adjusted elevation created by the projection of the plane are then used in creating the images for display on the synthetic vision display. The result is that all of the runways within a group, along with their neighboring terrain, are displayed as being coplanar.

17 Claims, 8 Drawing Sheets

(56) References Cited

U.S. PATENT DOCUMENTS

| | | |
|---|---|---|
| 7,027,046 B2 | 4/2006 | Zhang |
| 7,089,092 B1 | 8/2006 | Wood et al. |
| 7,098,913 B1 | 8/2006 | Etherington et al. |
| 7,123,260 B2 | 10/2006 | Brust |
| 7,177,731 B2 | 2/2007 | Sandell et al. |
| 7,212,216 B2 | 5/2007 | He et al. |
| 7,268,702 B2 | 9/2007 | Chamas et al. |
| 7,283,064 B2 | 10/2007 | He |
| 7,286,062 B2 | 10/2007 | Feyereisen et al. |
| 7,312,725 B2 | 12/2007 | Berson et al. |
| 7,363,121 B1 | 4/2008 | Chen et al. |
| 7,375,678 B2 | 5/2008 | Feyereisen et al. |
| 7,382,287 B1 | 6/2008 | Chen et al. |
| 2001/0028350 A1 | 10/2001 | Matsuoka et al. |
| 2001/0055021 A1 | 12/2001 | Freeman |
| 2002/0193920 A1* | 12/2002 | Miller et al. ............ 340/945 |
| 2003/0085896 A1 | 5/2003 | Freeman |
| 2004/0032418 A1 | 2/2004 | Cosman |
| 2004/0183796 A1 | 9/2004 | Velde et al. |
| 2007/0005199 A1 | 1/2007 | He |
| 2009/0040070 A1 | 2/2009 | Alter et al. |

* cited by examiner

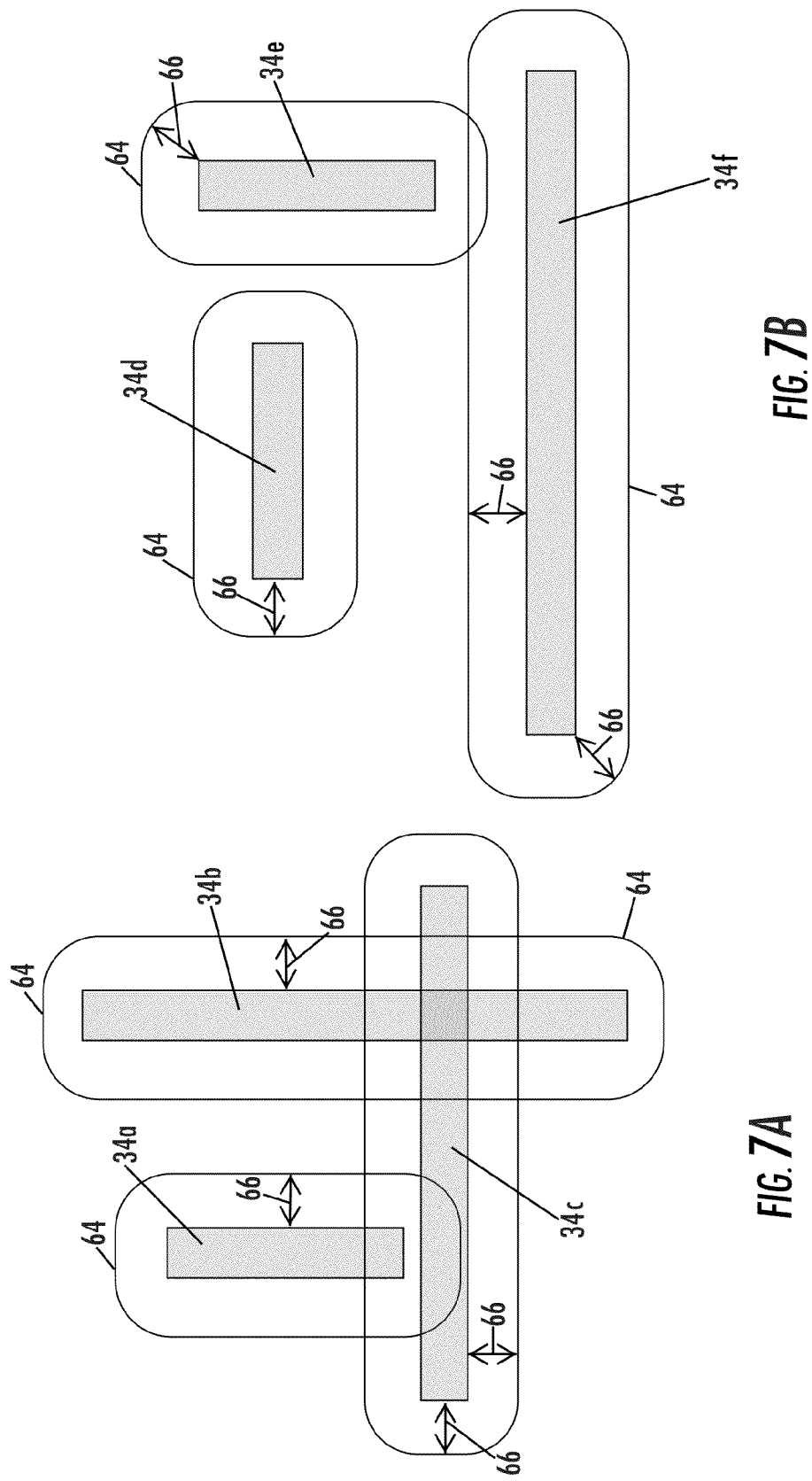

SYSTEM AND METHOD FOR DISPLAYING RUNWAYS AND TERRAIN IN SYNTHETIC VISION SYSTEMS

CROSS-REFERENCE TO RELATED APPLICATION

This application claims priority from U.S. patent application Ser. No. 61/254,787, filed on Oct. 26, 2009.

BACKGROUND OF THE INVENTION

This application relates to avionic display systems, and more particularly to avionic display systems utilizing synthetic vision systems wherein runways, terrain, and other objects may be displayed in a three dimensional manner.

Aircraft cockpit displays often include a primary flight display (PFD) that displays, among other things, an artificial horizon line that indicates the aircraft's pitch and roll relative to the actual horizon. The PFD typically also displays the aircraft's current heading. In some PFD's, the artificial horizon line is displayed with a solid color above the horizon line—typically a shade of blue to represent the sky—and a solid color below the horizon line—typically a shade of brown to indicate the earth. Such displays do not provide any indication of the contours of the ground over which the aircraft is flying.

More advanced PFDs may include the feature of synthetic vision, which does provide images indicating the contours of the ground. With such displays, the ground is displayed in a three-dimensional manner so as to generally match what the pilot would see when he or she looks out the cockpit front windshield at the terrain in front of the aircraft. In order for the PFD to properly display the contours of the terrain in a three-dimensional manner, the PFD accesses data that defines the elevation of the ground at the areas being displayed. Such data is commercially available from multiple sources and may be uploaded to the PFD in multiple manners. Such data includes the height of the ground at thousands, if not millions, of data points distributed across one or more geographic areas. Such data may originate from one or more satellite measurements, one or more U.S. space shuttle missions, or from other sources.

Regardless of the source of the terrain height data, such data may, for example, include the height of the Earth's terrain for approximately every six arc-seconds of latitude and longitude over a particular geographic area, such as North America, or some other area. From this data, the PFD is able to visually re-create on its screen a rendering of the Earth's terrain that approximates the actual terrain of the Earth over which the aircraft is currently flying.

In addition to the contours of the terrain, synthetic vision displays may also display other ground-based landmarks, such as, for example, the runways at airports. In order for the PFD to display the runways at their proper locations and elevations, the PFD often consults an additional database that includes airport data which defines the location, elevation, and other features of airports and their associated runways. The PFD uses this data to render images on the PFD screen that approximate how the actual runway looks to the pilot when the pilot looks through the front windshield. The runway data typically come from a different source than the terrain data. For example, the runway data may be the result of manual surveying of each airport runway. Regardless of the source of the runway data, the runway data may include runway elevation information that either does not match the terrain height data, or that was measured at different locations than the measurements of the terrain height data.

SUMMARY OF THE INVENTION

In accordance with its multiple embodiments, the present invention provides methods and systems for rendering runways on a synthetic vision-equipped aircraft display, such as, but not limited to, a primary flight display, in a manner that provides a three-dimensional image of the runway without any substantial visual artifacts. The systems and methods merge the data from a terrain database and an airport database so that the resulting images generated from the terrain and airport data show the runway matching the terrain. Such merging may involve a reconciliation of contradictory data and/or the generation of new data, and such merging allows the PFD to display three dimensional representations of the runway and adjacent terrain in a manner that better reflects the actual terrain and runway.

According to one embodiment, a method of displaying a runway on an aircraft display in a three dimensional manner is provided. The method includes receiving information about a height of the runway; receiving information about a height of at least one terrain point near the runway; using the height of the runway to determine a plane; using the plane to determine an adjusted height for the terrain point near the runway; displaying the runway; and displaying the terrain at the at least one terrain point as having the adjusted height.

According to another embodiment, a method of displaying a plurality of runways in a three dimensional manner on an aircraft display is provided. The method includes receiving information about a location of a first runway at an airport; receiving information about a location of a second runway at the airport; determining if the first and second runways lie within a threshold distance of each other; and displaying both the first and second runways on the aircraft display as lying within a common plane if they are within the threshold distance from each other.

According to another embodiment, a system for displaying three dimensional images of terrain and runways on an aircraft display is provided. The system includes a screen, a memory, and a controller. The screen displays images that are viewable to the pilot. The memory includes data defining a first height of a runway at a first location and a second height of the runway at a second location. The memory also includes data defining a plurality of heights for a plurality of terrain points. The controller is in communication with the screen and the memory and is adapted to determine a plane using the first and second heights of the runway. The controller projects the plane onto a set of the plurality of terrain points and generates three dimensional images of the runway and the set of terrain points for display on the screen. The images depict the runway and the set of terrain points as being coplanar.

According to still another embodiment, a system for displaying three dimensional images of terrain and runways on an aircraft display is provided. The system includes a screen for displaying images, a memory, and a controller. The memory contains first data defining a location of a first runway and second data defining a location of a second runway. The controller is in communication with the screen and the memory. The controller determines if the first runway and the second runway lie within a threshold distance of each other. The controller also generates three dimensional images of the first and second runways for displaying on the screen. The images depict the first and second runways as lying in a common plane if the first and second runways lie within the threshold distance of each other.

According to still other embodiments, the height information received for each runway may include at least two height values—one for a first location on the runway, and another one for a second location on the runway. If multiple runways lie within the threshold distance of each other, the multiple height values for each runway may all be used in determining the plane. The determination of the plane may be accomplished using a least squares method that is based on the height values for each of the runways. Other mathematical methods may alternatively be used to determine a plane from the plurality of runway height values. The system may receive terrain height values for a plurality of terrain points and adjust at least some of the height values of these terrain points using a projection of the plane. The system may also define a plurality of triangles using the terrain points as vertices of the triangles, determine if any of the runways fall within any of the triangles, and for those triangles in which the runway falls, use the plane to define adjusted heights for all three of the vertices of those triangles in which the runway falls. The terrain having the adjusted heights is then displayed on the display in a three-dimensional manner.

BRIEF DESCRIPTION OF THE DRAWINGS

FIGS. 7A-7C are plan views of various illustrative runway arrangements showing how the display system may group the runways.

DETAILED DESCRIPTION OF THE EMBODIMENTS

Figure 1:
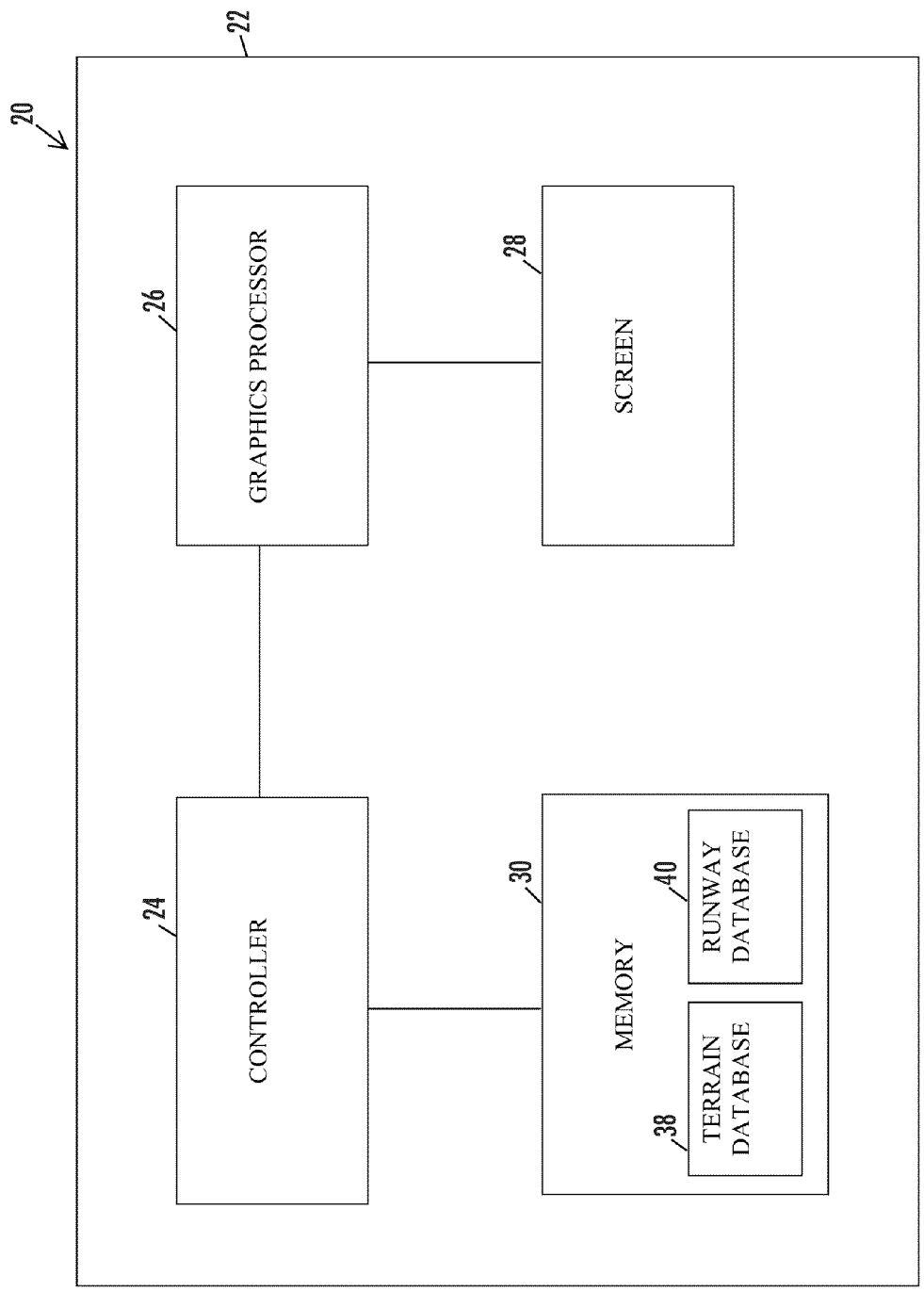
FIG. 1 is a block diagram of an avionics display system according to a first embodiment.

An avionics display system 20 according to a first embodiment is depicted in block diagram format in FIG. 1. In the embodiment shown therein, display system 20 includes a display unit 22 inside of which is contained a controller 24, a graphics processor 26, a screen 28, and a memory 30. Display unit 22 may take on a wide variety of different forms. In at least one embodiment, display unit 22 is a primary flight display. In other embodiments, display unit 22 may be a multi-function display, an electronic flight bag, or any of a variety of other types of avionic displays on which it is desirable to display three dimensional images of runways and terrain. It will also be understood by those skilled in the art that the components shown in FIG. 1 as being physically located inside of display unit 22 can be changed to different physical locations. For example, memory 30 may be located outside display unit 22 at any desirable location so long as controller 24 has access to the contents of memory 30. Similarly, controller 24 may be partially or wholly located outside of display unit 22. Other variations to the physical location of the components of display unit 22 may also be implemented.

Figure 2:
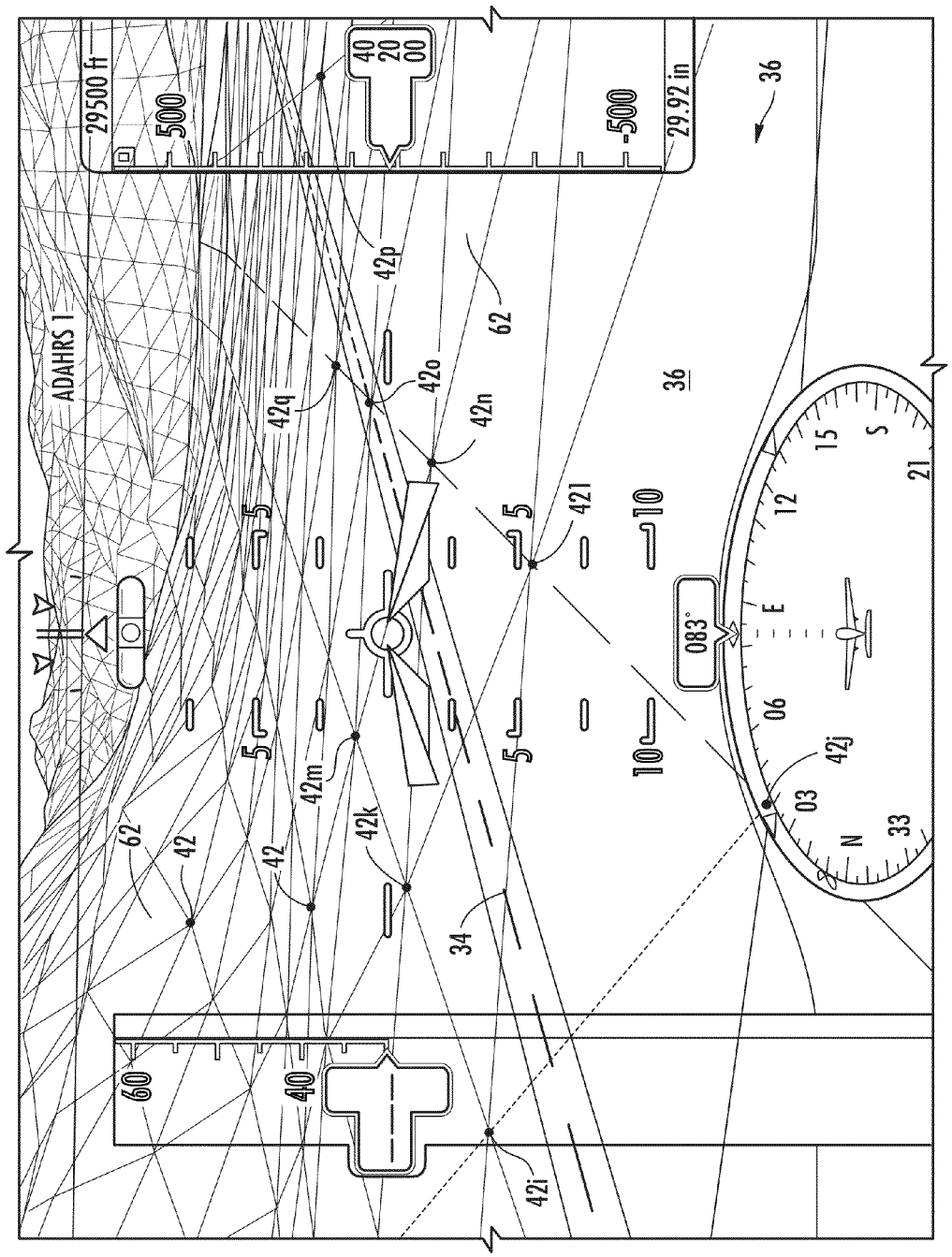
FIG. 2 is an illustrative synthetic vision image showing terrain and a runway that may be displayed on the screen of the display system of FIG. 1.

Display unit 22 is generally adapted to display on screen 28 synthetic vision images of the terrain and various landmarks surrounding the current location of the aircraft. For example, FIG. 2 illustrates a portion of a screenshot 32 that may be displayed on screen 28 of display unit 22. As can be seen in FIG. 2, screenshot 32 includes a three dimensional image of a runway 34 and surrounding terrain 36. The runway 34 and terrain 36 are displayed on screen 28 in a manner such that the view presented on screen 28 has a three dimensional appearance. Further, as is known in the art, the three dimensional view of terrain 36 and runway 34 is repetitively updated multiple times a second in order to account for the movement of the aircraft. Thus, the rendering of terrain 36 on screen 28 is continually updated in order to provide images that generally match the actual views of the terrain that a pilot would see looking out the front windshield of the aircraft as the aircraft moves. For example, if the pilot were flying over a mountainous region, terrain 36 of screenshot 32 would be rendered on screen 28 in a manner that generally matched the contours of the actual mountains over which the aircraft was flying. On the other hand, if the aircraft were currently flying over generally flat terrain, the image of the terrain 36 in screenshot 32 would be rendered such that the terrain appeared to be flat.

Controller 24 of display system 20 may comprise one or more microprocessors, field programmable gate arrays, microcontrollers, systems-on-chip, and/or any other electronic circuitry capable of carrying out the functions described herein, as would be known to one of ordinary skill in the art. If controller 24 comprises two or more discrete components, the physical location of the components relative to each other is immaterial. That is, for example, portions of controller 24—such as a first microprocessor—could be contained within display unit 22 while other portions—such as a second processor—could be located outside of display unit 22. Alternatively, controller 24 could be located entirely outside of display unit 22. The term "controller" is therefore intended to broadly refer to any different type of electronic circuitry that is capable of carrying out the algorithms described herein, whether implemented as a single component or multiple components.

As is also shown in FIG. 1, display unit 22 includes a graphics processor 26, which may be a conventional off-the-shelf graphics processor capable of generating images on screen 28 in response to instructions received from controller 24. While graphics processor 26 is depicted in FIG. 1 as being a physically separate entity from controller 24, it will be understood by those skilled in the art that the term "controller," as used herein, is broad enough such that, in at least one embodiment, graphics processor 26 could be considered a component of controller 24. Thus, while FIG. 1 illustrates controller 24 as physically separate from graphics processor 26, this is merely an illustration of but one example of the layout of display system 20. Indeed, a separate graphics processor 26 is not a necessary component of display unit 22. In at least some embodiments, controller 24 could manipulate the images displayed on screen 28 without the utilization of a separate graphics processor 26. Alternatively, a single microprocessor could be programmed to carry out both the computation algorithms and the display processes described herein. Still other variations are possible.

Screen 28 may be a conventional liquid crystal display (LCD) screen, a plasma screen, or any other type of screen on which graphic images may be displayed. Memory 30 may store the instructions utilized by controller 24 in carrying out the algorithms described herein. Alternatively, the instructions followed by controller 24 could be stored in a separate memory. Memory 30 may comprise random access memory (RAM), read-only memory (ROM), flash memory, or one or more different types of portable electronic memory, such as discs, DVDs, CD-ROMs, etc., or any suitable combination of these types of memory. Memory 30 is in electronic communication with controller 24 such that controller 24 may read the data contained within memory 30 as well as write data to memory 30, if desired. Controller 24 is also in communication with graphics processor 26 which, in turn, is in communication with screen 28. Controller 24 is therefore able to dictate the images that are displayed on screen 28 through instructions issued from controller 24 to graphics processor 26. As will be described in more detail below, the instructions from controller 24 to graphics processor 26 regarding images to be displayed on screen 28 may be based upon information contained within memory 30.

As illustrated in FIG. 1, memory 30 includes a terrain database 38 and a runway database 40. Terrain database 38 includes a set of data that identifies the height of the earth's terrain at a plurality of points. Such terrain databases 38 are commercially available from multiple sources. In some embodiments, terrain database 38 may be contained on a portable flash memory device, such as a Secure Data (SD) card, a Compact Flash card, or other portable flash memory device. In such a case, display unit 22 may include a port for receiving the portable flash memory device. Such a port would be in electronic communication with controller 24 such that controller 24 is able to read the contents of the portable flash memory device. Alternatively, the contents of terrain database 38 may be stored internally within display unit 22.

Figure 3:
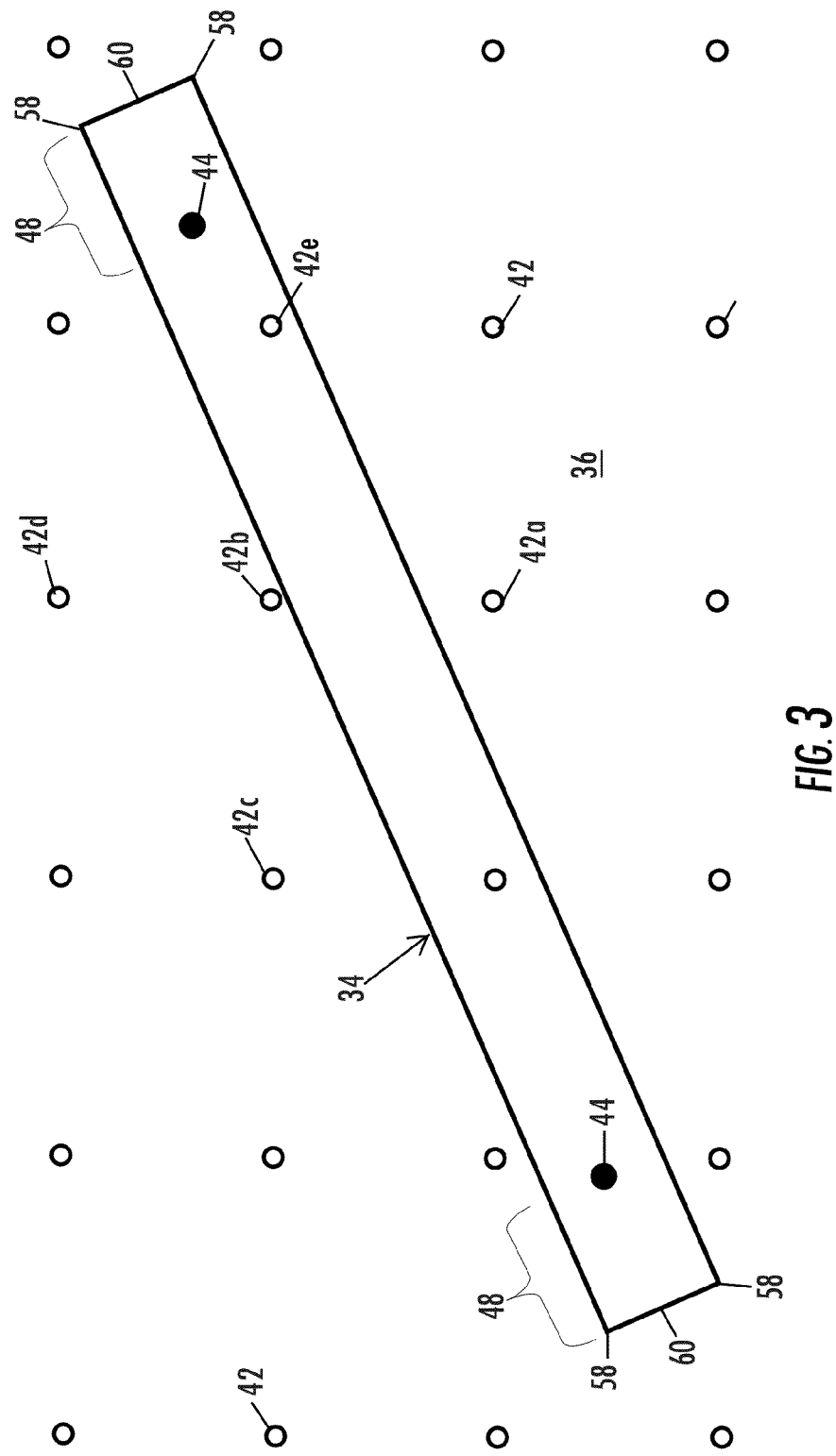
FIG. 3 is a plan view diagram of an illustrative set of terrain data points and a runway.

Regardless of the physical location of terrain database 38, the contents of terrain database include height values corresponding to a plurality of different locations on the earth. For example, terrain database 38 may include height values at each of a plurality of latitude and longitude coordinates. An example of this is illustrated in FIG. 3. FIG. 3 shows a plurality of terrain points 42 represented as small circles. Each terrain point 42 is defined by a latitude value, a longitude value, and a height value. Thus, for example, terrain point 42a might lie at 45° north latitude, 45° west longitude, and a height of 500 feet. Terrain point 42b identifies the height of the terrain at a different latitude and longitude. In at least one embodiment, the spacing between terrain points 42 may be approximately six arcseconds. Thus, terrain point 42b might lie six arcseconds north of terrain point 42a. Similarly, terrain point 42c might lie approximately six arcseconds west of terrain point 42b. The spacing between terrain points 42 will depend upon the resolution of the data contained within database 38, and may vary from one commercial source to the next. It will be understood by those skilled in the art, of course, that the spacing between terrain points 42 can be varied without changing the principles of operation described herein.

The height stored for each of the terrain points 42 in terrain database 38 may be a height value that is specified with respect to any known reference. In one embodiment, the height value might correspond to a height above the geoid, the reference ellipsoid, the mean sea level, the center of the earth, a frame of reference defined in accordance with the World Geodetic System (e.g. WGS84, EGM 1996, EGM 2008, etc.), or any other useful coordinate frame of reference. Terrain database 38 may further include an indication for each terrain point 42 as to whether or not that point corresponds to a location on the earth that is normally under water. This enables the synthetic vision display system to display lakes, rivers, oceans, and the like in a manner different from non-riparian terrain. Other manners for distinguishing between ground terrain and water terrain may also be used in conjunction with terrain database 38.

Runway database 40 contains multiple pieces of information about the runways over a particular geographic region. For example, runway database 40 may contain runway information for all of North America, a portion of North America, the entire world, or other geographic areas. The information in runway database 40 is commercially available from different sources. Often, updates to the database 40 may be made on a periodic basis, such as approximately once a month, or at other frequencies, in order to account for changes and/or additions to the existing runways. As with terrain database 38, runway database 40 may be stored in memory internal to display unit 22 or alternatively stored externally, such as on a portable flash memory device. If stored on a portable flash memory device, display unit 22 may include a port for receiving and reading the portable flash memory device.

Regardless of the manner in which runway database 40 is stored, runway database 40 generally includes multiple pieces of information about each of the runways stored therein. Such information may include the latitude and longitude coordinates of one or more touch down points 44, as well as the elevation for each of the touch down points 44 (FIG. 3). Runway database 40 further includes data identifying the width of the runway, the length of the runway, the bearing of the runway, and any offset distances 48 of the touch down points 44 from the nearest endpoint 60 of the runway.

As was noted earlier, the source of the elevation data in the runway database 40 may come from manual surveying of the runways. As was also noted earlier, the elevation information contained within terrain database 38 may come from measurements made by one or more satellites, and/or one or more space shuttle flights. Regardless of the particular source for these two databases, the runway elevation data of database 40 and the terrain data of database 38 may not coincide. This may be due to several factors. First, the different manners in which the elevation data are measured for the two databases may lead to different results. Second, the latitudinal and longitudinal coordinates of the runway touch down points 44 will rarely, if ever, coincide with the latitudinal and longitudinal coordinates of the terrain points 42. Thus, the elevation data stored in database 40 will typically refer to the elevation at specific locations (latitude and longitude coordinates) that are different from the specific locations (latitude and longitude coordinates) of terrain database 38. Still other factors may result in a discrepancy or mismatch between the elevation data of database 40 and the elevation data of database 38.

Unless preventative steps are taken, differences in the elevation data stored in databases 38 and 40, as well as differences in the locations of the elevation values, may result in visual artifacts being created on screen 28 when one or more runways 34 and surrounding terrain 36 are displayed. One example of such a possible discrepancy can be better understood with respect to FIG. 3. Suppose, for example, that both touch down points 44 of runway 34 had an elevation of 50 (units may be arbitrary) according to the data contained within runway database 40. Suppose further that terrain point 42e had an elevation of 30 (in the same units) according to the data contained within terrain database 38. If the avionics display system were to display the terrain at point 42e at a height of 30, while also displaying the entire runway 34 at a height of 50, the runway would appear to be 20 units above the terrain at point 42e. Clearly this would be an undesirable visual artifact. Avionics display system 20 processes the data from databases 38 and 40 in such a manner that visual artifacts, like the one described above, are reduced or eliminated.

Figure 4:
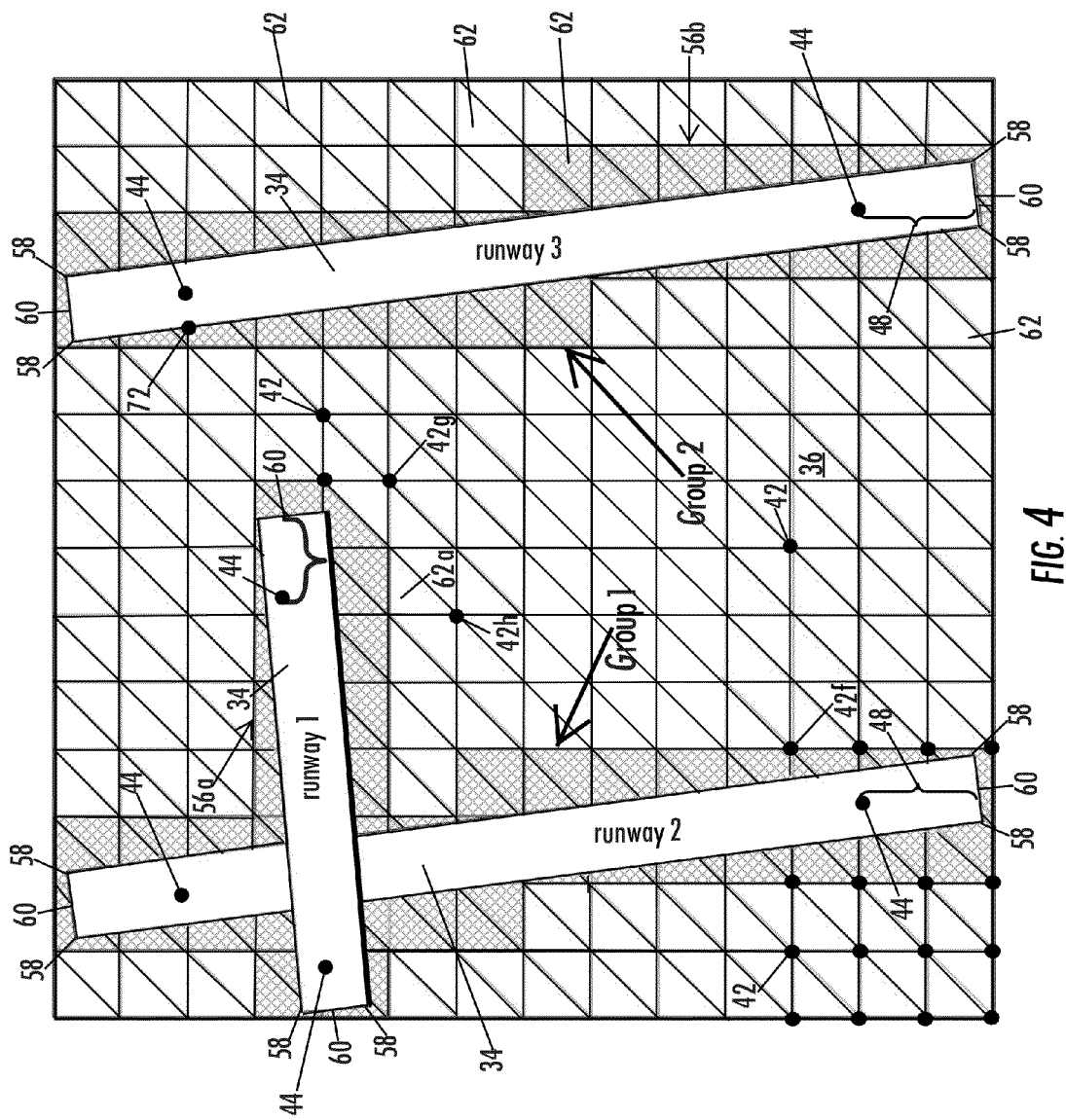
FIG. 4 is a plan view diagram of another illustrative set of terrain data points and a plurality of runways.

The manner in which avionics display system 20 avoids the potential of visual artifacts can be better understood with reference to FIG. 4. FIG. 4 illustrates an arbitrary arrangement of three runways 34 at an airport. In general, display system 20 ensures that the runways are displayed on screen 28 as coplanar with the underlying and adjacent terrain. In general, display system 20 will use the elevation information for the runways to calculate a plane, and then adjust the heights, if necessary, of the adjacent terrain such that the elevations of the adjacent terrain are coplanar with the calculated plane. Further details of the steps taken to accomplish this result will be described below with respect to FIGS. 4-6.

Figure 6:
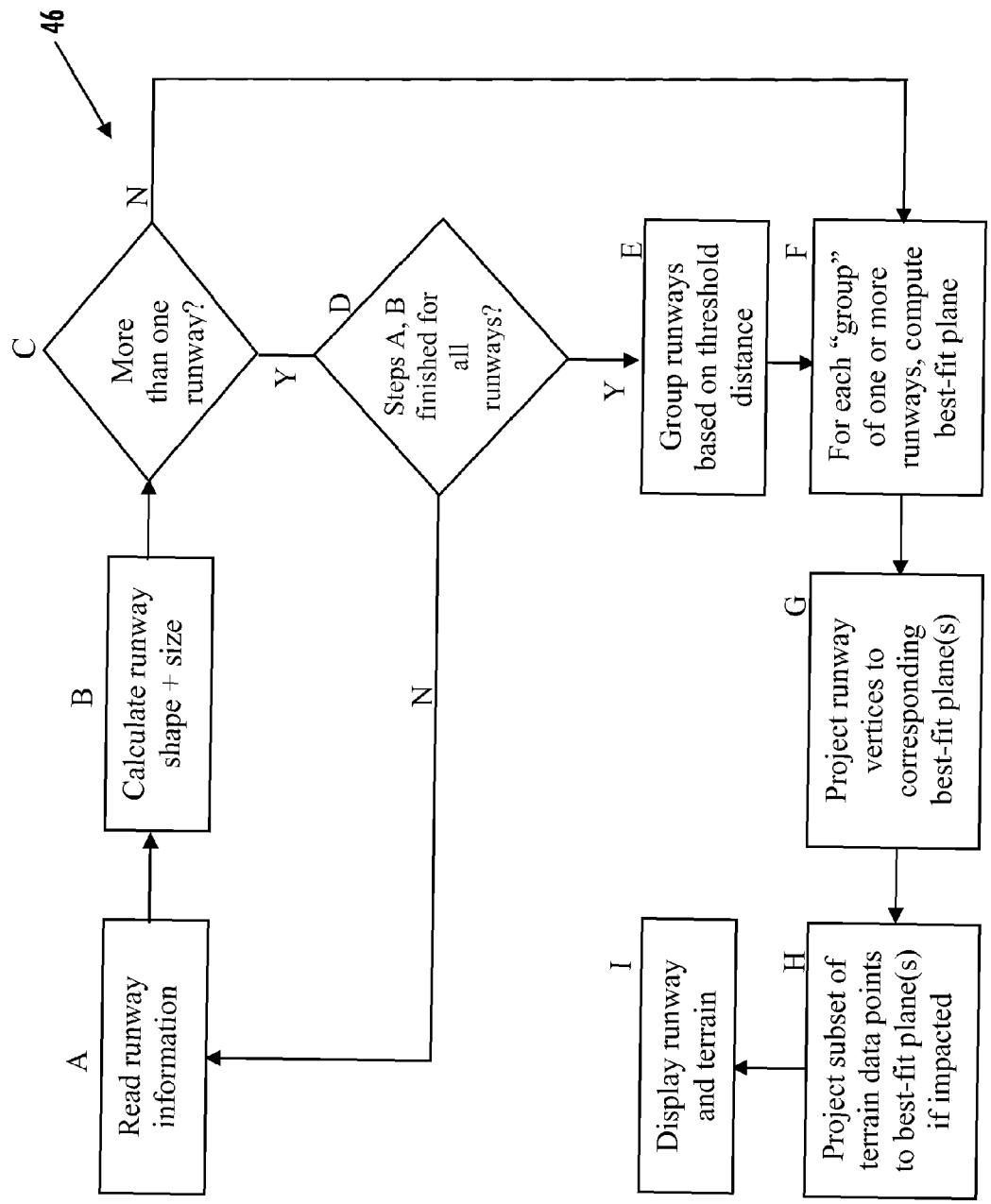
FIG. 6 is a flowchart illustrating one embodiment of a method for displaying one or more runways on an aircraft display.

Display method 46 includes multiple steps that are carried out by controller 24, and the manner in which the processor, or other structure(s), of controller 24 could be programmed to carry out these steps would be well within the skill level of an ordinary skilled programmer in conjunction with the descriptions provided herein. FIG. 6 illustrates a display method 46 that may be implemented by display system 20. Display method 46 begins at a first step A in which controller 22 reads runway information from runway database 40 for any runway that is to be displayed on screen 28. As noted earlier, this runway information will typically include the latitude and longitude coordinates of two touch down points 44 for each runway 34. Further, this information will include the elevation of each of the touch down points 44. Still further, the runway information will also include the width of the runway, the direction of the runway, and any offset 48 of the touch down points 44 from the nearest end 60 of the runway. The information read by controller 24 at step A of method 46 is sufficient for controller 24 to calculate the shape and size of the corresponding runway 34. Controller 24 accomplishes these calculations at step B. The result of these calculations is the definition of a rectangle having the dimensions of the actual runway and having the correct geographic location as the actual runway.

At step C, controller 24 determines if there any additional runways to be currently displayed on screen 28 of display system 20. This determination is made based upon the current location of the aircraft, the current heading of the aircraft, and the designer's choice of how far forward of the aircraft the system will synthetically depict images of terrain and/or runways. These factors will define the size and location of the geographical area that will be displayed on screen 28. After determining this geographical area, controller 24 searches through runway database 40 for all runways within this geographic area. In some embodiments, controller 24 may search through an area larger than the currently displayed geographic area in order to allow, if desirable, advance processing to be performed for rendering the runway on screen 28 prior to the runway coming into view on screen 28. In the example screenshot of FIG. 2, there is only a single runway 34 visible. Thus, for the situation depicted in FIG. 2, controller 24 would determine at step C that there were no more runways to depict, and would then advance to step F of method 46. In contrast, if the aircraft were at a location and heading where multiple runways were to be displayed on screen 28, controller 24 would proceed from step C to step D.

At step D, controller 24 determines whether all of the multiple runways that are to be displayed on screen 28 have had their rectangular shape and sizes calculated at steps A and B. If not, control returns to steps A and B and controller 24 proceeds to calculate the size and shape of one of the runways whose size and shape has not yet been calculated. From there, controller 24 proceeds through step C to step D and once again determines if the sizes and shapes of all of the runways have been calculated at steps A and B. If not, steps A and B are repeated again and again, as necessary, until the sizes and shapes of all of the multiple runways to be displayed have been determined. Once these sizes and shapes have been determined, controller 24 proceeds to step E.

Figure 7C:
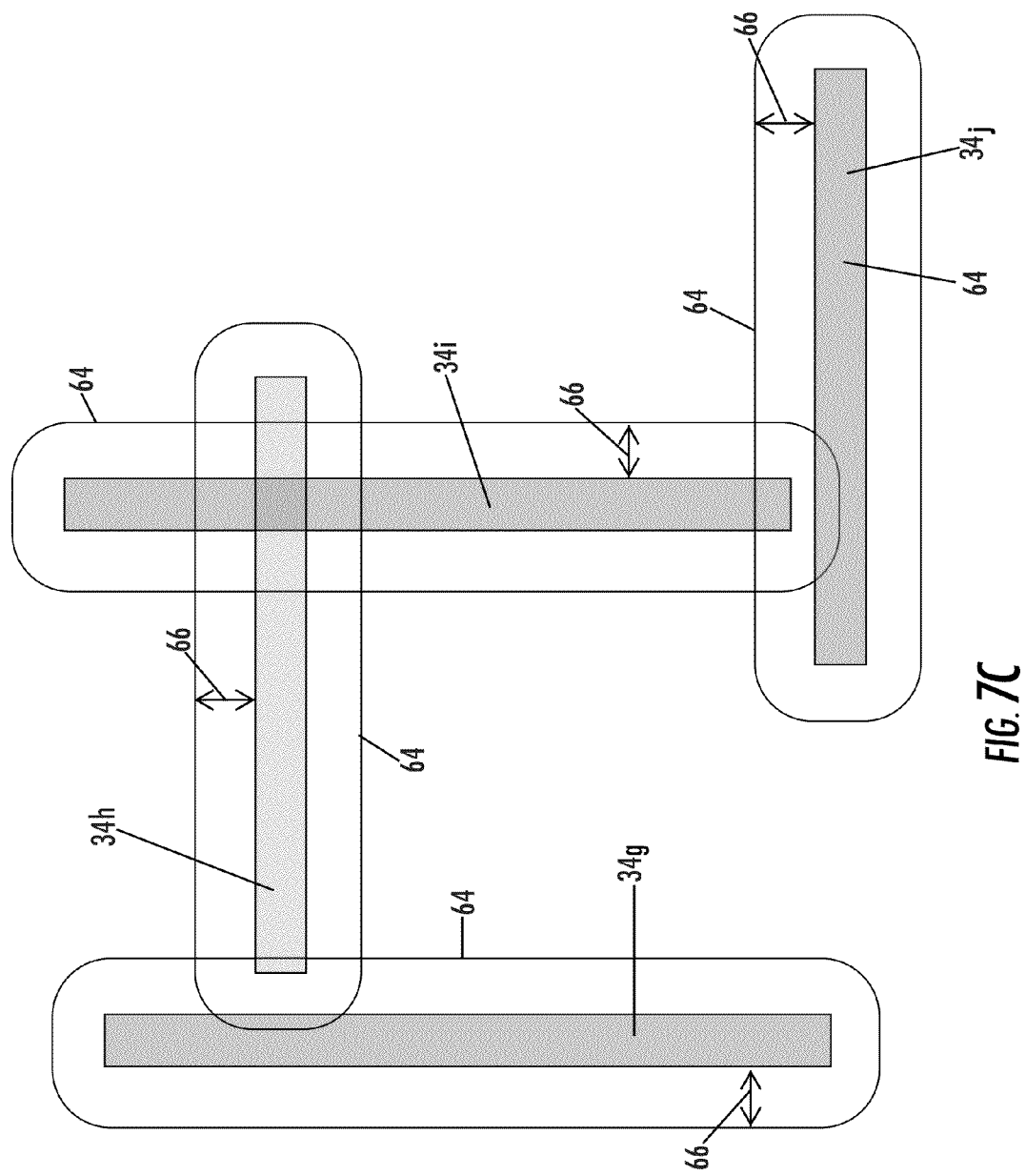

At step E of display method 46 (FIG. 6), controller 24 determines if there are any runways adjacent to each other. In other words, after controller 24 computes the shape and size of the multiple runways, controller 24 determines if any of these multiple runways lie within a threshold distance 66 of each other (FIGS. 7A-7C). The threshold distance may vary from embodiment to embodiment. Further, the threshold distance 66 may be influenced by the amount of distance between terrain points 42 in terrain database 38. More specifically, if the distance between terrain points 42 is smaller, the threshold distance may be smaller, and vice versa. Generally speaking, the threshold distance may be chosen so that any runways outside the threshold distance have at least one complete triangle 62—defined by three adjacent terrain points 42 as vertices—between the runways, as will be discussed more below. In at least one embodiment, where terrain points 42 are provided approximately every six arcseconds, which corresponds to approximately 600 feet, the threshold distance might be set to be at least 800 feet (this distance being chosen as slightly greater than the length of the hypotenuse—848 ft—of the right triangles 62 defined by 600 foot sides). Other threshold distances can, of course, be used.

The reference to the threshold distance 66 refers to the distance between the rectangular peripheries of a pair of runways. In other words, if any point along the rectangular edge of a first runway 34 lies within the threshold distance of any point along the rectangular edge of a second runway 34, then the two runways are considered to be within the threshold distance of each other. Determining whether two or more runways lie within the threshold distance of one another may be carried out using known mathematical techniques and algorithms.

After determining whether a pair of runways lies within the threshold distance of each other at step E, controller 24 will also assign these two runways to a first group at step E if they lie within the threshold distance of each other. If they do, then controller 24 will determine whether any of the other runways processed at steps A and B fall within the threshold distance of this first group. A runway is considered to fall within a threshold distance of a group of runways if the runway lies within the threshold distance of at least one of the runways within the group. If any runways lie within the threshold distance of the first group, those runways are also added to the first group. The result is that the first group will consist of the entire set of runways in which each runway within the set lies within the threshold distance of at least one other runway in the set.

Several examples illustrating the manner in which controller 24 groups together runways are shown in FIGS. 7A-7C. Each of these figures illustrates an arbitrary arrangement of runways 34. For each runway 34, a corresponding boundary line 64 is shown surrounding the runway 34. Boundary line 64 is spaced the threshold distance 66 away from the nearest edge of the corresponding runway 34. Boundary line 64 therefore defines and encloses the entire area lying within the threshold distance of its corresponding runway. Controller 24 will therefore group together two runways if the boundary lines of one of the runways overlaps at least a portion of the other runway. For example, in FIG. 7A, controller 24 will group together runway 34a with runway 34c because the boundary line 64 surrounding runway 34a overlaps a portion of runway 34c. Or, looked at from another viewpoint, controller 24 will group together runway 34a and runway 34c because the boundary line 64 of runway 34*c* overlaps a portion of runway 34*a*. Controller 24 will also group runway 34*b* together with runways 34*a* and 34*c* because the boundary 64 around runway 34*b* overlaps runway 34*c*. While runways 34*a* and 34*b* do not overlap each other, nor do their respective boundaries 64 overlap each other, they are still part of the same group because they are grouped with runway 34*c*.

FIG. 7B illustrates another illustrative example of an arbitrary layout of airport runways 34. In this example, controller 24 will not group any of runways 34*d*, 34*e*, or 34*f* together because none of the runways lie within the threshold distance 66 of each other. Stated alternatively, while boundary 64 of runway 34*e* overlaps boundary 64 of runway 34*f*, none of the boundaries overlap any of the runways themselves. Thus, in the example of FIG. 7B, controller 24 would assign each of the runways 34*d*-*f* to a separate group, wherein each group consisted of only a single runway.

In the example shown in FIG. 7C, controller 24 would group all four runways 34*g*, 34*h*, 34*i*, and 34*j* together into a single group because all of these runways are linked together by each other. That is, each and every one of the runways within the group lies within the threshold distance of the subgroup that contains the rest of the runways in the group.

FIG. 4 illustrates another example of the grouping of runways. In this example, runway #1 and #2 are grouped together. These two runways are grouped together because they overlap, and therefore lie within the threshold distance of each other. Runway #3 of FIG. 4 is assigned to its own group (group 2 in FIG. 4) because it lies outside the threshold distance of both runways #1 and #2, and does not lie within the threshold distance of any other runways. As will be discussed in more detail below, the runways of group 1 will be processed separately from the runways of group 2.

In carrying out the calculations of the threshold distance and the subsequent grouping of runways at step E of method 46, controller 24 may be programmed, in at least some embodiments, to operate under the assumption that runways at different airports will always lie outside the threshold distance of the runways from other airports. Therefore, in order to avoid burdening controller 24 with unnecessary calculations, controller 24 may be programmed such that it does not make inter-airport runway threshold distance calculations, but instead only makes intra-airport runway threshold distance calculations. Thus, for example, if a pilot were flying at a location and heading in which, say, Chicago's O'Hare airport and Midway airport were both being displayed on screen 28, controller 24 could be programmed such that it did not check to see if any runways at the Midway airport were within the threshold distance 66 of any of the runways at the O'Hare airport. Instead, controller 24 could be programmed to determine the grouping of runways at O'Hare and then, separately, determine the grouping of runways at Midway, or vice versa.

In an alternative embodiment, display system 20 could be configured to pre-process the data in runway database 40 in such a manner that the grouping of runways was determined pre-flight. This would reduce the computational load on controller 24 and allow controller 24 to skip step E. Display system 20 could still further be modified to also pre-compute the shapes and sizes of runways pre-flight, thereby eliminating step B of method 46. The results of any or all of these pre-flight calculations could be stored in memory 30 for usage throughout the life of display system 20, or at least throughout the time period during which runway database 40 remains valid (i.e. does not expire). Alternatively, database 40 could be altered itself to include these pre-flight computations.

At step F, controller 24 processes each of the groups of runways by computing a plane 50. The computed plane may be a best fit plane, or it may be another type of plane. The plane that is calculated is based upon the runway information provided from runway database 40. One example of such a plane 50 is illustrated in FIG. 5.

Figure 5:
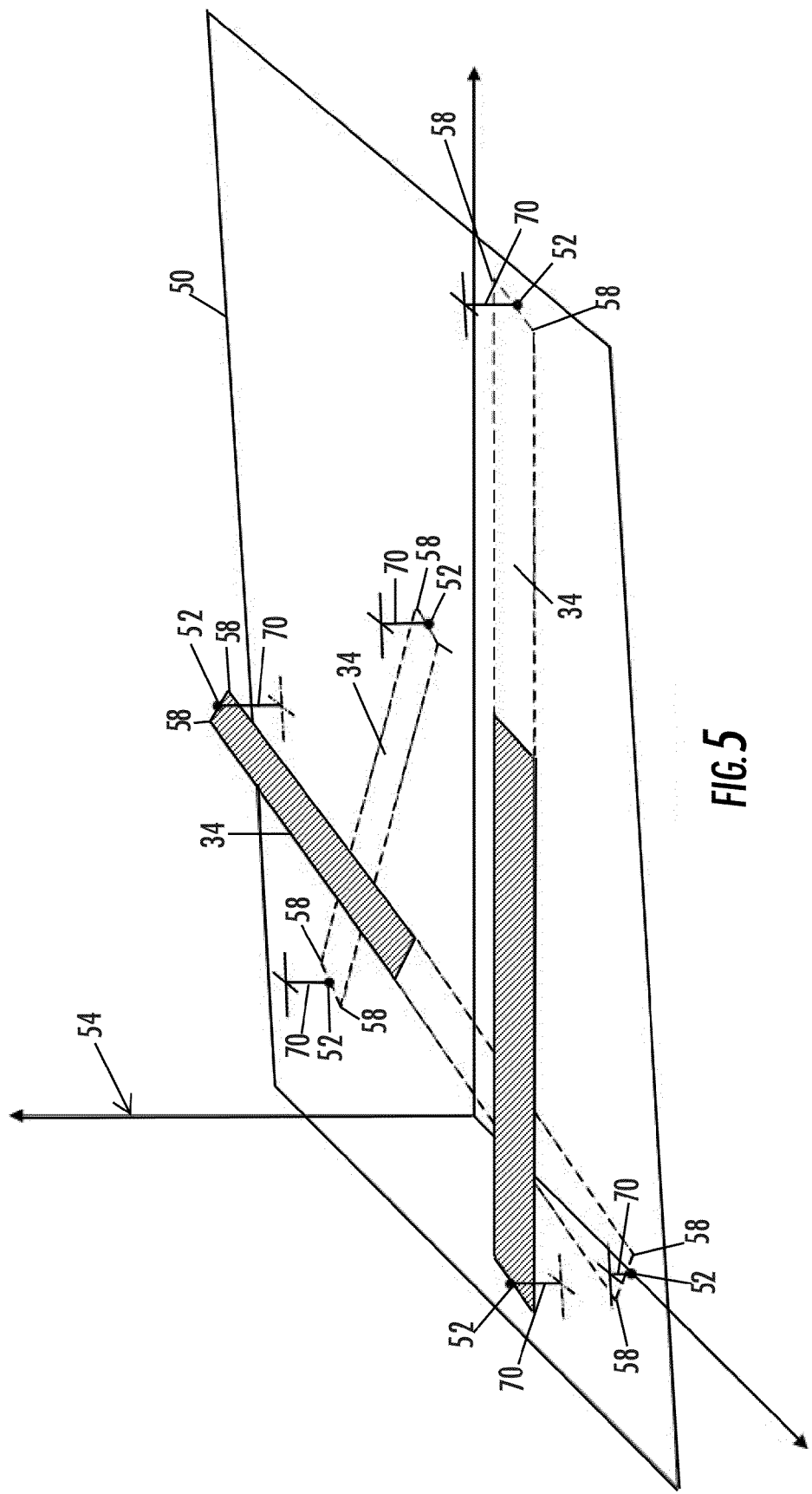
FIG. 5 is a perspective diagram of a plurality of runways illustrated relative to a plane that is calculated from multiple runway data points.

FIG. 5 illustrates three runways 34 that overlap and which are therefore grouped together by controller 24 at step E. An elevation data point 52 is defined at each end of each of the runways 34. Elevation data points 52 may come from several sources. In one embodiment, elevation data points 52 may be provided directly from runway database 40. In an alternative embodiment, runway database 40 may provide the elevations of touch down points 44 and controller 24 may compute elevation data points 52 at the ends of the runways by utilizing the elevation of touch down points 44 and the offset distances 48, if any. In still another embodiment, elevation data points 52 may be the same as touch down points 44 and be provided by runway database 40 (i.e. offsets 48 may be zero in the example of FIG. 5). Elevation data points 52 may also come from other sources.

Each elevation data point 52 in FIG. 5 includes at least three coordinates that are defined by a frame of reference 54. As can be seen therein, the data points 52 are defined in a frame of reference 54 having an x-axis, a y-axis, and a z-axis. In one embodiment, the x-axis and the y-axis may correspond to lines of latitude and longitude, respectively, or vice versa. In other embodiments, the x and y-axis may correlate to other geographic references. Regardless of the precise definition of the x and y axes, they are defined in such a way that controller 24 may correlate them to a specific location on the earth.

As can further be seen in FIG. 5, the coordinate frame of reference 54 includes a z-axis. The z-axis extends in the vertical direction. Thus, the value of the z coordinate provides an indication of the elevation of each of the data points 52. As was discussed earlier, this elevation may be defined in any of multiple different manners. As one example, the elevation may be defined with respect to mean sea level. In another embodiment, the elevations may be defined as a height above the surface of the geoid. In still other embodiments, the elevations may be defined according to the World Geodetic System (WGS) 84 standard, or any of the past or future WGS standards. In still other embodiments, this elevation may be defined in other frames of reference, or with respect to other standards. In at least one embodiment, controller 24 may utilize whatever elevation frame of reference database 40 uses. To the extent terrain database 38 and runway database 40 use different coordinate frames of reference, different units, or different standards for defining elevations, controller 24 is programmed to convert one or both of the elevations in databases 38 and 40 into a common frame of reference or common standard with common units.

With continuing reference to FIG. 5, controller 24 utilizes the elevation data points 52 to compute plane 50 at step F. In at least one embodiment, controller 24 computes the plane by using a best fit mathematical algorithm. Such algorithms are known in the art and need not be described herein. In one example, the computation of the plane may yield a mathematical definition of plane 50 in accordance with the following formula:

$$z = ax + by + c, \qquad \text{(Eq. 1)}$$

where z, x, and y refer to the values along the z, x, and y axes, respectively. The term "best fit" refers to the fact that the computed plane 50 is defined such that the sum of the squared errors 70 in the vertical direction between the plane and the elevation data points 52 is minimized (see FIG. 5). Stated alternatively, the computation of plane 50 may utilize a least squares mathematical algorithm. In other embodiments, different algorithms may be used for calculating a plane based on elevation data points 52. Such plane calculation algorithms may allow weighting one or more of the elevation data points 52 more heavily or less heavily than some of the other elevation data points 52. Still other embodiments may utilize other formulas for computing a plane 50 from elevation data points 52

As was noted previously, controller 24 calculates a plane 50 for each group of runways that were defined in step F of method 46 (FIG. 6). In the example illustrated in FIG. 5, there is only a single group of runways. Therefore, controller 24 will calculate a single plane 50. In the example of FIG. 4, there are two groups of runways. The first group comprises runways #1 and #2. The second group includes runway #3. For the example illustrated in FIG. 4, therefore, controller 24 will compute a first plane 50 for runways one and two and a second plane 50 for runway three. Controller 24 will compute as many planes 50 as there are runway groups that are to be displayed on screen 28. In other words, depending upon the current location and heading of the aircraft, controller 24 will determine the number of runways which are to be displayed in the synthetic vision images on screen 28. From the set of runways that are to be displayed, controller 24 will determine the number of groups of runways in accordance with step F of method 46. For each group of runways, controller 24 will calculate a corresponding plane 50.

At step G of display method 46, controller 24 uses plane 50 to determine the elevations of the runway vertices 58. Controller 24 accomplishes this by first determining the two horizontal coordinates (e.g. x and y) that define each of the runway vertices 58. These coordinates may be computed from the information stored in runway database 40. As mentioned above, for example, runway database 40 may define the location of touch down points 44, any offset 48 from the touch down points 44 to the ends 60 of the runway, as well as the width of the runway. Using this information, the horizontal coordinates of the vertices 58 may be easily determined using known mathematical computations. In order to determine the elevations at each of the runway vertices 58, controller 24 utilizes the mathematical formula that defines plane 50. Thus, for example, controller 24 will plug in the x and y values for a particular runway vertex 58 into the plane formula (such as equation 1 from above), which will then yield a corresponding elevation for that vertex 58. The elevation of that vertex will lie on plane 50. Controller 24 will do this for all of the runway vertices 58 within a given group.

At step H of display method 46, controller 24 projects each calculated plane onto a subset 56 of terrain points 42. The detailed manner in which controller 24 determines which terrain points 42 fall into a particular subset 56 will be described more below. In general, however, controller 24 will display all of the terrain points in subset 56 as lying in plane 50. That is, controller 24 will adjust, if necessary, the elevation of the terrain points 42 within subset 56 so that they lie in plane 50. Thus, all of the runways 34 within a given group, along with all of the terrain points 42 within the corresponding subset 56, will be displayed as lying within a common plane. There will, therefore, be no discrepancies between the elevations of the runways and the adjacent terrain, and the overall images shown will have the runways and terrain interpreted together in a gap-free manner. Thus, when controller 24 displays the runways and adjacent terrain on screen 28, no visual artifacts will be present. Instead, the pilot will see the runway and adjacent terrain as all lying within a common plane. While the synthetic vision display on the runway will therefore be based on information that may be slightly different from the actual elevations of a particular runway, any such discrepancies between the display data and the actual data will be negligible. In other words, while display method 46 may end up displaying a particular runway at a height that differs from the actual height of the real runway on the earth, this difference will be negligible, particularly when manifested on screen 28. Controller 24 will continue to display the terrain 36 in accordance with the information from terrain database 38 for all those terrain points 42 that lie outside the subsets 56.

If a particular runway group only includes a single runway, in which case steps D and E of method 46 were skipped, then controller 24 may only have two elevation data points 52 for the runway with which to compute plane 50. In order to compute the mathematical definition of a plane from only two data points 52, controller 24 may select an arbitrary third horizontal location 72 (FIG. 4) for use in computing plane 50. For example, in order to compute the plane 50 corresponding to runway #3 in FIG. 4, controller 24 might select third location 72 for use in defining a plane. The horizontal coordinates of third point 72 may be determined from the data supplied by runway database 40. For example, the horizontal coordinates of third point 72 could be determined from the horizontal coordinates of touchdown point 44, the direction of runway #3, and the width of runway #3. Such information could yield the horizontal coordinates of third point 72 by adding a horizontal vector to the coordinates of the adjacent touch down point 44, wherein the length of the vector was half the width of the runway, and the horizontal direction of the vector was perpendicular to the direction of the runway (which may be stored in database 40, or could alternatively be determined from a straight line connecting touch down points 44). In one embodiment, the elevation of third point 72 could be set to the same as that of the adjacent touch down point based on the assumption that the actual runway has a negligible amount of slope from the left side of the runway to the right side. Armed with two horizontal coordinates and a vertical coordinate for third point 72, along with similar information for the two touch down points 44, controller 24 would have sufficient information to compute plane 50.

At step I, controller 24 displays the runways and terrain that lie in front of the aircraft's current location on screen 28 in a three-dimensional manner. In displaying the runways and terrain on screen 28, controller 24 will utilize the elevations of the terrain from terrain database 38 for all of the terrain points 42 that lie outside of the subsets 56. In other words, except for terrain points 42 lying within a subset 56, controller 24 will display all of the terrain in accordance with the information received from terrain database 42. For those terrain points 42 lying within a subset 56, controller 24 will display those terrain points on screen 28 such that the terrain points lie within their corresponding plane 50. Further, the runways 34 will be displayed on screen 28 such that they too lie within the corresponding plane 50. In this manner, all of the runways within a group, as well as the terrain points of the corresponding subset 56, will be displayed as being coplanar. This avoids any visual artifacts that may otherwise result from the different information contained within terrain database 38 and runway database 40.

The manner in which controller 24 creates three dimensional images for display on screen 28 of the data from databases 38 and 40, as well as that generated in method 46, may take on any of a variety of different known methods. Because such methods for creating synthetic vision images for display on screen 28 are known, they will not be described in further detail herein. As the aircraft in which display system 20 is positioned moves, controller 24, which is in communication with a navigation system (not shown), will update the images on screen 28 to generally match the landscape that is visible outside the front windshield of the aircraft's cockpit. If, as the aircraft continues to move, new runways 34 come into viewing range, controller 24 will utilize display method 46 in creating the images that show the runway. As was noted above, if a runway that comes into view is within a threshold distance of another one, or more than one other runway, the group of runways will be displayed such that they are coplanar. Further, as was described above, the subset of terrain points immediately adjacent the runway, or group of runways, will also be displayed as being coplanar with the runway, or group of runways.

The manner in which controller 24 defines which terrain points 42 are contained within a subset 56 will now be described. Controller 24 calculates subset 56 by using each terrain point 42 as a vertex for a plurality of triangles. Examples of triangles 62 are shown in FIGS. 2 and 4. It will be noted that, for clarity reasons, not all of the terrain points 42 are labeled or shown in FIGS. 2 and 4. However, a terrain point 42 is defined at each vertex of each of the triangles 62 shown therein. The triangles 62 are defined by neighboring terrain points. That is, none of the triangles 62 encompass any terrain points 42 in their interior. Rather, the only terrain points 42 for each triangle 62 are those that define the three vertices.

As seen in FIG. 4, each terrain point 42 defines a vertex for six triangles. Controller 24 calculates subset 56 for a given runway, or a group of runways, by determining each and every triangle 62 that is at least partially overlapped by the runway, or group of runways. Thus, in FIG. 4, a first subset 56A of terrain points 42 is defined by all the terrain points 42 within the cross-hatched triangles neighboring runways #1 and #2. As can be seen therein, for example, terrain point 42f in FIG. 4 is part of the subset 56a corresponding to runway group #1 because it forms the vertex for at least one triangle that is at least partially overlapped by runway #2. In contrast, terrain point 42g of FIG. 4 is not part of any subset 56 because it is not the vertex of any triangle 62 that is partially overlapped by any runways. FIG. 4 also illustrates the subset 56b of terrain points 42 that correspond to runway group #2.

Controller 24 will display the two groups of runways illustrated in FIG. 4 by following display method 46 for both group #1 and group #2. The result of this will be images in which runways #1 and #2, as well as all of the terrain points 42 within subset 56a, are all displayed as being coplanar with each other. Runway #3, as well as all of the terrain points 42 in subset 56b, will also all be displayed as being coplanar. The plane in which runway #3 is displayed is not related to the plane in which runways #1 and #2 are displayed, and the two planes may be different or they may be the same, depending on the elevation data for the runways.

All of the terrain points 42 in FIG. 4 that are outside of subsets 56a or b will be displayed to have the elevations indicated in terrain database 38. Thus, for example, triangle 62a of FIG. 4 may or may not be displayed as being coplanar with runway group #1, depending upon the elevation value of terrain point 42h in FIG. 4. If the plane 50 in which runway group #1 is displayed happens to coincide with the elevation of terrain point 42h, then triangle 62a will be coplanar with runway group #1. If however, the elevation at point 42h, as defined in terrain database 38, does not coincide with a projection of the runway group #1 plane 50, then triangle 62a will not be displayed as being coplanar with the runways and terrain points in runway group #1. Similar reasoning applies to all of the other terrain points 42 shown in FIG. 4.

As another illustrative example, terrain points 42i-q of FIG. 2 will be part of the subset 56 corresponding to runway 34 of FIG. 2. This list of terrain points 42 is not a complete listing of all of the terrain points of subset 56. Rather, this listing is representative of only a fraction of the points defining subset 56. Several of the terrain points 42 in subset 56 are not visible in FIG. 2, and many of those in the far distance of the image of FIG. 2 have not been labeled for purposes of clarity. However, as has been described above with respect to display method 46, controller 24 will display the image in FIG. 2 such that runway 34 and all of the terrain points 42 within subset 56 are coplanar with each other. The remaining terrain points 42 will be displayed in accordance with the elevation information found in terrain database 38.

It will be understood by those skilled in the art that, although FIG. 2 illustrates terrain 36 in such a manner that the borders of triangles 62 are marked by lines, this is not necessarily the manner in which controller 24 will generate images for display on screen 28. In at least one embodiment, the lines defining triangles 62 will not be visible on screen 28. Rather, each of the triangles will be shaded in such a manner so as to visually reflect the plane defined by the three vertices for each triangle 62. Coloring may also be added to the triangles in order to distinguish between different types of topography, such as mountains and/or riparian locations. Thus, the actual lines defining the borders of triangle 62 may not be indicated by any lines on screen 28.

While the examples and discussion contained herein have primarily made reference to the use of a Cartesian coordinate system for carrying out the calculations and algorithms described herein, it will be understood by those skilled in the art that all of the calculations and algorithms described herein could be carried out using other types reference frames, such as a spherical coordinate frame of reference, or other type of reference frame.

It will also be understood by those skilled in the art that other modifications can be made. As but one example, the threshold distance could take on a value of zero in at least one embodiment. In such an embodiment, controller 24 would only group together runways that actually overlapped.

Additional changes and modifications in the specifically described embodiments may be carried out with departing from the principles of the present invention, which is intended to be limited only by the scope of appended claims, as interpreted according to the principles of patent law, including the doctrine of equivalence.

What is claimed is:

1. A method of displaying a runway on an aircraft display in a three-dimensional manner, said method comprising:
   receiving information about a height of the runway;
   receiving information about a height of at least one terrain point near the runway;
   using the height of the runway to determine a plane;
   using said plane to determine an adjusted height for the terrain point near the runway;
   displaying the runway;
   displaying the terrain at said at least one terrain point as having the adjusted height;
   receiving information about a height of a second runway;
   determining if said second runway lies within a predetermined distance of said runway;
   if said second runway lies within the predetermined distance, using said height information about said second runway in determining said plane; and
   if said second runway lies outside the predetermined distance, using said height information about said second runway to determine a second plane, and further using said second plane to determine a second adjusted height for a second terrain point near the second runway, and displaying said second terrain point at the second adjusted height.

2. The method of claim 1 further including:
if said second runway lies with the predetermined distance, displaying said runway and said second runway as lying in a common plane on said display.

3. The method of claim 2 wherein said common plane is determined using first and second height values for the runway and first and second height values for the second runway.

4. The method of claim 3 wherein said common plane is defined using a least squares method that takes into account the first and second height values for the runway and the first and second height values for the second runway.

5. The method of claim 1 wherein using said plane to determine an adjusted height for the terrain point includes determining a mathematical formula for said plane and calculating the adjusted height at the terrain point using the mathematical formula.

6. A method of displaying a runway on an aircraft display in a three-dimensional manner, said method comprising:
receiving information about a height of the runway;
receiving information about a height of at least one terrain point near the runway;
using the height of the runway to determine a plane;
using said plane to determine an adjusted height for the terrain point near the runway;
displaying the runway;
displaying the terrain at said at least one terrain point as having the adjusted height;
receiving information about heights of a plurality of additional terrain points near the runway;
defining a plurality of triangles using said plurality of additional terrain points as vertices of said triangles;
determining if any of said runway falls within any of the triangles;
for those triangles in which said runway falls, using said plane to define adjusted heights for all three of the vertices of those triangles in which said runway falls; and
displaying all of said triangles in which said runway falls as being coplanar with said runway.

7. The method of claim 6 further including:
receiving information about a height of a second runway;
determining if said second runway lies within a predetermined distance of said runway;
if said second runway lies within the predetermined distance, using said height information about said second runway in determining said plane; and
if said second runway lies outside the predetermined distance, using said height information about said second runway to determine a second plane and displaying said second runway as being coplanar with said second plane.

8. A method of displaying a plurality of runways in a three-dimensional manner on an aircraft display, said method comprising:
receiving information about a location of a first runway at an airport;
receiving information about a location of a second runway at said airport;
determining if said first and second runways lie within a threshold distance of each other;
displaying in a three-dimensional manner both said first and second runways on said aircraft display as lying within a common plane if they are within the threshold distance from each other;
if said first and second runways are within the threshold distance, calculating the common plane based upon height information for both the first runway and the second runway, receiving height information about a plurality of terrain points within a vicinity of said airport;
defining a plurality of triangles using said plurality of terrain points as vertices of said triangles;
determining a first set of triangles wherein each triangle in said first set encompasses at least a portion of said first runway;
determining a second set of triangles wherein each triangle in said second set encompasses at least a portion of said second runway; and
if said first and second runways are within said threshold distance, displaying all of the terrain points within said first and second sets as being coplanar with said first and second runways;
wherein, if said first and second runways are outside of said threshold distance, said method further includes displaying all of the terrain points within said first set as being coplanar with said first runway, and displaying all of the terrain points within said second set as being coplanar with said second runway.

9. The method of claim 8 wherein said height information includes at least two height values for said first runway and at least two height values for said second runway, and said calculating of the common plane utilizes a least squares method for determining the plane.

10. A system for displaying three-dimensional images of terrain and runways on an aircraft display, said system including:
a screen for displaying the images;
a memory containing first data defining a location of a first runway and second data defining a location of a second runway;
a controller in communication with the screen and the memory, said controller adapted to receive information about a height of the first runway and information about a height of at least one first terrain point near the first runway, said controller adapted to determine a first plane using the height of the first runway and using the first plane to determine an adjusted height for the first terrain point near the first runway;
said controller further adapted to generate three-dimensional images for display on said screen of the first runway at the first plane and the at least one first terrain point as having the adjusted height;
said controller further adapted to receive information about a height of a second runway, determine if said second runway lies within a predetermined distance of said runway, and use said height information about said second runway in determining said first plane if said second runway lies within the predetermined distance and to display said second runway at said first plane; and
said controller further adapted to use said height information about said second runway to determine a second plane if said second runway lies outside the predetermined distance, and to use said second plane to determine a second adjusted height for a second terrain point near the second runway, and to display said second runway at said second plane and said second terrain point at the second adjusted height.

11. The system of claim 10 wherein said controller determines the height of said runway and said second runway by:
defining a set of terrain points and a plurality of triangles having vertices at said terrain points;

determining a set of said triangles, said set of triangles being defined such that each triangle in said set at least partially overlaps the runway and said second runway; and defining said set of terrain points as those terrain points corresponding to all of the vertices within said set of triangles.

12. The system of claim 10 wherein said controller uses a least squares algorithm for determining said plane when said first and second runways lie within said predetermined distance.

13. The system of claim 10 wherein said memory further includes third data defining a location of a third runway and said controller is further adapted to determine if said third runway lies within the threshold distance of either or both of said first and second runways, wherein said images depict as being coplanar any group of said first, second, or third runways that lie within the threshold distance of each other.

14. The system of claim 10 wherein said controller is adapted to determine said common plane based upon a first plurality of height values for said first runway and a second plurality of height values for said second runway.

15. The system of claim 14 wherein said controller uses a least squares method with said first and second plurality of height values for determining said common plane.

16. The system of claim 15 wherein said memory further includes height data indicating heights for a plurality of terrain points, and said controller is further adapted to display a set of said terrain points as lying in said common plane.

17. The system of claim 16 wherein said controller is adapted to determine said set of terrain points by defining a plurality of triangles using said plurality of terrain points as vertices of said triangles; determining a set of triangles from said plurality of triangles wherein each triangle in said set of triangles encompasses at least a portion of either said first runway, said second runway, or both said first and second runways; and defining said set of terrain points as those terrain points corresponding to the vertices within said set of triangles.

* * * * *